Jan. 9, 1968  F. J. MURPHREE  3,363,226
DATA PROCESSING SYSTEM
Filed Oct. 12, 1965  2 Sheets-Sheet 1

INVENTOR.
FRANCIS J. MURPHREE
BY
ATTYS.

Jan. 9, 1968  F. J. MURPHREE  3,363,226
DATA PROCESSING SYSTEM
Filed Oct. 12, 1965  2 Sheets-Sheet 2

INVENTOR.
FRANCIS J. MURPHREE
BY
ATTYS.

United States Patent Office 3,363,226
Patented Jan. 9, 1968

3,363,226
DATA PROCESSING SYSTEM
Francis J. Murphree, Sunnyside, Fla., assignor to the United States of America as represented by the Secretary of the Navy
Filed Oct. 12, 1965, Ser. No. 495,362
12 Claims. (Cl. 340—3)

ABSTRACT OF THE DISCLOSURE

A rapid-in-slow-out data processing system, which facilitates the permanent mapping of a sea floor, having a sonar with a delay line and memories for storing timely delayed output signals from said delay line and sonar. A recorder permanently records said timely delayed stored signals in response to a predetermined program and a given keying pulse.

---

The invention described herein may be manufactured and used by or for the Government of the United States of America for governmental purposes without the payment of any royalties thereon or therefor.

The present invention relates generally to data processing systems and in particular is a sonar mapping system which may be attached to a conventional sonar system to effect a permanent chart record and display of the area being surveyed thereby.

In the past, due to the extremely rapid azimuth scanning rate of most pulse type mine countermeasure sonar systems, the readout thereof was performed by a cathode ray tube. Unfortunately, such readout device provides only a very limited period of memory, due to the comparatively rapid decay of the phosphor luminescence on the face thereof. Hence, since such readout is obviously not permanent, no map-like record is available for study later on or for other purposes.

The present invention overcomes this particular disadvantage of the prior art devices, in that it provides a method and means for slowly recording signal data that was originally obtained as a result of the extremely rapid scanning of the transducers that received it. For example, it allows relatively slow speed, conventional chart type recorders, such as the helical recorder manufactured by the Alden Electronic Equipment Corporation of Westboro, Mass., to be used as the readout and display device. Of course, because the mapping information or data signals are actually "printed" on a continuous chart in such recorders, the resulting record is, for all practical purposes, permanent. This, then, becomes a rather distinct advantage when such fast azimuth scan sonars as the AN/UQS-1 sonar system is being used to map the sea floor at some distance ahead of the ship or other vehicle carrying the sonar itself.

It is, therefore, an object of this invention to provide an improved sonar mapping system.

Another object of this invention is to provide a mapping system that produces a slow readout when attached to a relatively rapid-scan echo-ranging system.

Still another object of this invention is to provide a method and means for producing a permanent record or map of the sea floor, objects thereon, and contiguous therewith, ahead of a moving vessel, such as a ship, submarine boat, or the like, which extends a predetermined amount on either side of the intended path thereof.

A further object of this invention is to provide a sonar attachment that converts the azimuth scan data obtained from a rapid-scanning sonar system to a permanent record thereof.

Still another object of this invention is to provide an improved method and means for reading out and displaying the data processed by a sonar or other echo-ranging apparatus by means of a helical recorder.

Another object of this invention is to provide an improved rapid-in-slow-out data processing system.

Another object of this invention is to provide an improved method and means of searching for and identifying submarine mines and other targets that may be disposed within a subaqueous medium.

Another object of this invention is to provide an improved mapping system which may be easily and economically manufactured, operated, and maintained.

Other objects and many of the attendant advantages will be readily appreciated as the subject invention becomes better understood by reference to the following detailed description when considered in conjunction with the accompanying drawings wherein.

Figure 1:
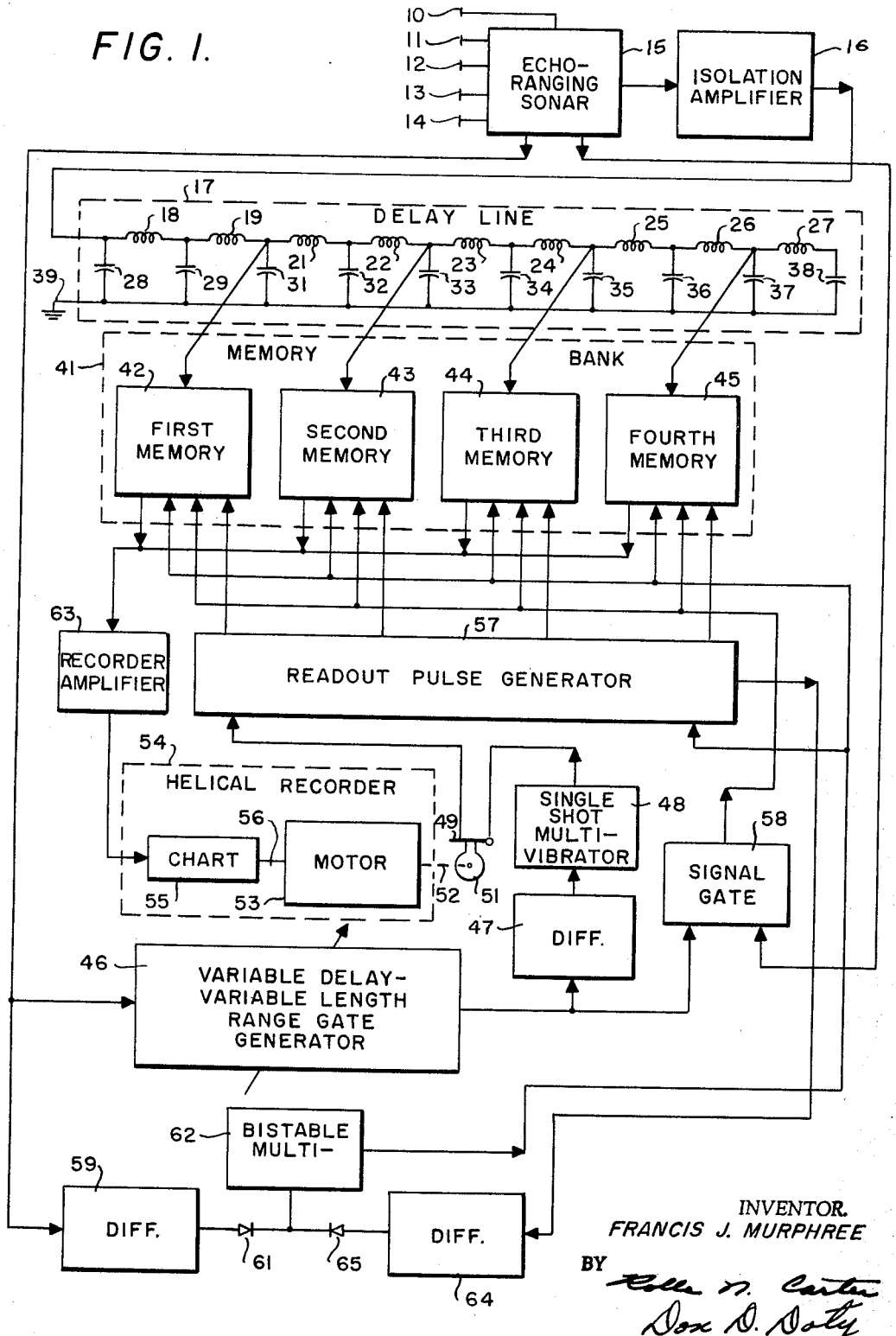
FIG. 1 is a block diagram of a preferred embodiment of the mapping system constituting this invention.

Referring now to FIG. 1, an exemplary preferred embodiment of the subject invention is shown as having a broadcasting transducer 10 and a plurality of receiving hydrophones 11 through 14 connected to an echo-ranging sonar 15. Perhaps at the outset, it should be understood that echo-ranging sonar 15 is a conventional sonar system, and that the aforesaid hydrophones connected thereto may be as many in number as necessary or desirable to perform the echo-ranging function during any given operational circumstances. In the ANUQS-1 sonar, for example, each hydrophone is slightly displaced from the focus of a section of a parabola, so that each combination of hydrophone and parabola results in an acoustic beam slightly displaced from that formed by the next hydrophone and parabola. Scanning the hydrophones then permits one to determine from which direction an incoming signal arrives by observing which has the longest output.

It should also be understood that, although an echo-ranging sonar is the operating apparatus associated with the subject mapping system, any other appropriate echo-ranging apparatus, such as a radar system, or the like, may be substituted therefor without violating the spirit or the scope of this invention, inasmuch as so doing would be well within the purview of one skilled in the art having the teachings herewith presented.

The azimuth scan pulse output of echo-ranging sonor 15 is coupled through an isolation amplifier 16, such as a cathode follower, an emitter follower, or the like, to the input of a delay line 17. Delay line 17 has a plurality of stages, the number of which is determined by the number of receiving hydrophones and memory units used and the amount of delay required between the successive outputs therefrom. Delay line 17 in this particular instance, consists of a plurality of inductances 18 through 27 with a plurality of capacitors respectively connected to the respective junctions thereof and a ground 39.

This particular embodiment of a delay line was selected because of the simplicity of structure thereof; however, it should be obvious that other delay lines such as shift registers, or the like, may be substituted therefor, if operational circumstances so warrant.

The outputs of delay line 17 are connected to those stages thereof which provide the amount of delay desired when a signal supplied thereto is traveling therealong. Hence, as may readily be seen, a memory bank 41 having a first memory 42, a second memory 43, a third memory 44, and a fourth memory 45, which, in turn, respectively have their inputs connected to the appropriate outputs successively disposed along the aforesaid delay line 17.

The individual memories of the aforesaid memory bank may be any of many well known conventional types available from commercial sources. However, in this particular instance, memories 42 through 45 are intended to be similar to those disclosed in patent application Ser. No. 410,034, filed Nov. 9, 1964, entitled, Memory Device, by Francis J. Murphree. Accordingly, each of said memory devices is susceptible to being loaded by a read-in pulse and unloaded by a readout pulse, with data being stored therein therebetween. Furthermore, because each of said memory devices requires, in this particular caes, several other input-operator pulses, they each have a total of 4 inputs and one output.

Another of the outputs of the aforesaid echo-ranging sonar 15 is a keying pulse which effectively initiates the transmitted ping therefrom. This keying pulse is also used to timely trigger various other components of the invention to effect timely loading and unloading of the memory devices of the aforesaid memory bank 41. Hence, this particular keying pulse output is connected to the input of a variable delay-variable length range gate generator 46. Range gate generator 46 is, of course, well known and conventional in the sonar art, and is the device which determines the range gate at which the sonar system is operating at any particular instance. This class of devices is discussed in Section 5.7 of the Electronic Time Measurements book of the MIT Radiation Laboratory Series, published by McGraw-Hill Book Company in 1949. The block diagram shown in FIGURE 5.13 thereof indicates the general approach. For the purpose of this invention, the movable pulse output thereof may be used to trigger a single shot multivibrator of fixed or adjustable length to actually generate the range gate desired. The control thereof is usually effected by a human operator in order to obtain conventional range information with respect to any particular target located within a given gate position but also may be handled automatically by the sonar itself. The output of range gate generator 46 is supplied to the input of a differentiator 47, the output of which is connected to the input of a single shot multivibrator 48. The output of single shot multivibrator 48 is then coupled through a switch 49 which is timely opened and closed by rotatable cam 51.

The aforesaid rotatable cam 51 is connected by means of a shaft 52 to the motor 53 of a helical recorder 54. A chart and chart drive 55 are likewise connected by a shaft 56 to the aforesaid motor 53, as is conventional in chart type recorders. Although only a motor is shown here as driving chart 55, any suitable and changeable reduction gear or gears may be interposed therebetween in order to move the chart at any predetermined speed desirable for effecting the proper relationship therebetween and the speed of the vessel containing the subject invention. Helical recorder 54 is included in this particular embodiment of the subject invention because it happens to operate in a highly satisfactory manner therein, but it has also been determined that other appropriate commercial available recorders will work equally well.

Since the aforesaid cam 51 and chart 55 of helical recorder 54 are effectively connected to each other, said cam should be mounted on its shaft in such position that switch 49 will be closed at the same time that the printer means begins to sweep across the chart. Thus, it may be seen that the operation of switch 49 is properly synchronized with the operation of helical recorder 54 and, when closed, effectively connects the output of single shot multivibrator 49 to one of the inputs of a readout pulse generator 57.

Because there are, in this particular embodiment, four memory units within memory bank 41 and four hydrophones connected to echo-ranging sonar 15, there are four outputs from readout pulse generator 57 which are respectively connected to memory devices 42 through 45.

The output of range gate generator 46 is also applied to one of the inputs of signal gate 58. For all practical purposes, signal gate 58 is a switch which is closed as a result of a signal being applied thereto by said range gate generator 46. The other input to signal gate 58 is connected to the data signal output of echo-ranging sonar 15. The data signal applied thereto, is, of course, that which has been received at some particular time during the rapid scanning of hydrophones 11 through 14. The output of signal gate 58 containing said data signal is connected to an input of each of the aforesaid memory devices 42 through 45 for timely storage thereof therein.

The aforesaid keying pulse output of echo-ranging sonar 15 is also connected to the input of a differentiator 59, the output of which is coupled through a diode 61 before being connected to the input of a bistable multivibrator 62. The output of bistable multivibrator 62 is connected to another of the inputs of the aforementioned readout pulse generator 57 and to another of the inputs of each of the aforesaid memory units 42 through 45 of memory bank 41 for the timely enabling and erasing thereof for reasons which will be presented subsequently in connection with the discussion of the operation of the invention. Each of memory units 42 through 45 has its output connected through a recorder amplifier 63 to the chart printing device of helical recorder 54.

Another output of readout pulse generator 57, herein defined as the last readout pulse output, is connected to the input of a differentiator 64, the output of which is coupled through a diode 65 to the aforesaid input of bistable multivibrator 62.

Each of the elements represented in block form in FIG. 1 are well known and conventional in the art per se. Hence, it is their unique interconnections and interactions which constitute the subject invention and produces the unique results indicated above.

Briefly, the operation of this invention will now be discussed in connection with all figures.

Figure 2:
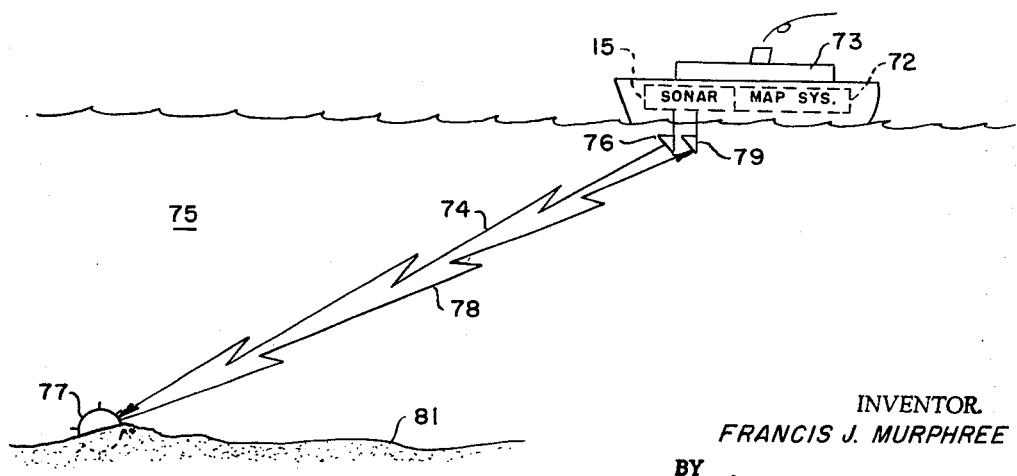
FIG. 2 is a quasi-pictorial view of a typical carrier vessel using sonar and this invention as an attachment thereto for the purpose of hunting submarine targets and displaying them on a chart recorder.

During normal operations, sonar 15 with the subject mapping system 72 attached thereto is suitably disposed in a marine-type carrier vessel, such as for example, ship 73, or any other vehicle warranted by the operational circumstances. As is shown in FIG. 2, said vessel proceeds along its intended course, and as it does so, echo-search acoustical signals are broadcast throughout sea water 75 ahead thereof by a projector transducer 76, in an effort to determine if any submarine targets, such as mine 77, seafloor 81, or any other target, are present. Echo signal 78 from mine 77, seafloor 81, or any other targets are then received by receiving transducer bank 79 which incorporates the aforesaid hydrophones 11 through 14 and perhaps numerous others as well. Of course, only 4 receiving hydrophones are herein illustrated for the sake of simplicity of disclosure, but in actual practice, a considerably larger number is ordinarily used.

Also for the purpose of simplicity of disclosure, only one mine target is shown as being partially buried in seafloor 81; however, it should be understood that in actual practice many of such targets, as well as targets of other types, may be present, too.

As is done in normal sonar operation, the receiver hydrophones 11 through 14 are rapidly scanned by sonar 15 for target signal information, and then, if any is present, it is stored temporarily for subsequent readout at such a rate that it can be handled by helical or other conventional recorders. In general, this invention performs these rapid storage and slow readout functions and it does it with the signals which appear at some predetermined or varying range setting. Although the sonar range setting itself is herein considered to be made in the conventional manner, it may perhaps be more clearly understood if it is mentioned at this time that the invention will function equally well when the range is set or varied by the sonar system or when it is set or changed by a human sonar operator.

Figure 3:
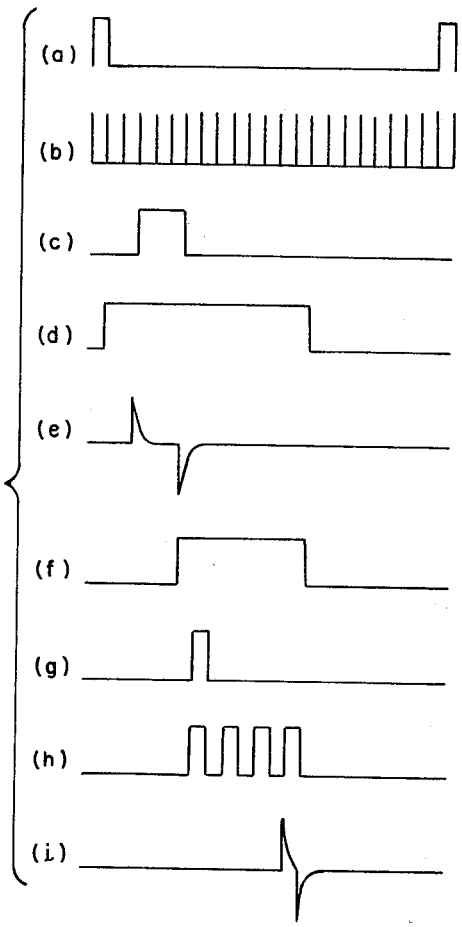
FIG. 3 is a graphical representation of idealized signal waveforms which occur as outputs from various and sundry elements incorporated in the device of FIG. 1.

The particular range setting which exists at any given instant is used by variable delay-variable length range gate generator 46 which, in response to a sonar keying pulse, such as is ideally depicted in FIG. 3(a), will produce a range gate pulse that is proportional to said range setting. Such range gate pulse is shown in an exemplarily manner in FIG. 3(c).

The aforesaid keying pulse is also applied to differentiator 59 where it is differentiated before being applied to bistable multivibrator 62. When so applied, it causes bistable multivibrator 62 to change state and produce the leading edge of the positive portion of the waveform depicted in FIG. 3(d). The change of state of multivibrator 62, in turn, timely causes all of the memory units of memory bank 17 to be enabled (turned on) in preparation for the timely storage of data signals. The exact timing of such memory enabling is critical only to the extent that it must occur at some reasonable time between the occurrence of the keying pulse and the beginning of the delayed range gate pulse. In this particular case, the aforesaid memory enabling occurs simultaneously with the occurrence of the leading edge of the idealized waveform of FIG. 3(d) and, as will be discussed more fully later on, the erase thereof occurs simultaneously with the trailing edge of said waveform.

The length of the aforementioned delay range gate pulse has been chosen in this preferred embodiment to be several times as long as the time interval between scan pulses. For instance, the ideally illustrated pulses of FIG. 3(d) represents the hydrophone scan pulses, then it may readily be seen that the range gate pulse has a period which is long enough to effectively include four thereof.

Because the keying pulse is generated concurrently with the signal or ping broadcast by the sonar transmitter, it acts as a basic timing and synchronizing parameter that is used to initiate a pair of related functions, namely, the timely reading in and subsequent reading out of the data stored in memory bank 41.

Generation of the aforementioned range gate pulse by range gate generator 46 is, of course, one of the operational procedures which causes the storage of data signals in the memory units to be effected at the proper times. This range gate pulse is the pulse which was referred to previously as the one which has a length that is proportional to the range gate setting being used at any particular instant. The length of the range gate can be made to change automatically as a function of the time interval between pings.

The instant said range gate pulse is generated, it is applied to signal gate 58 to open it, thereby allowing whatever scan data signals are present at the hydrophones at that time to pass through it into corresponding memories of memory bank 41. In order to make the successive hydrophones respectively correspond to the successive memories, the scanning pulses of sonar 15 are applied to delay line 17. As they travel therealong, they successively energize the memory units. In other words, azimuth scan pulses of the type typically shown in idealized form in the waveform of FIG. 3(b) are supplied by sonar 15, pass through isolation amplifier 16, and travel along delay line 17. As each pulse, in its own turn, propagates down the delay line, it successively enables the memory units connected thereto.

The delay of each section of delay line 17 should be so designed as to be identical to that of the sampling interval of the scan signal, so that if, for example, n hydrophones are being sampled or scanned in a definite order, then the pulses traveling down the delay line energize each memory storage element in the same order and at the same time as the corresponding hydrophone is being scanned.

As previously suggested, the time required for one complete azimuth scan is approximately equal to the interval between scan pulses. As a result of this, each memory will contain the data obtained from at least one azimuth scan and probably from several azimuth scans. Thus, for instance, if one millisecond is required to complete one azimuth scan and the range gate pulse is 3 milliseconds long (as is relatively shown in FIG. 3(b) and FIG. 3(c)), the data from as many as four scans could be stored. In this case, each memory would contain target information within a 7.5 foot interval. In general, the range gate expressed in distance units should be at least as long as the distance the sonar moves between pings. Expressed electronically, the range gate pulse should preferably be long enough to include two or more scan pulses.

It may readily be seen that data is stored in those memories that are energized by those outputs of delay line 17 which occur while signal gate 58 is open.

Once readin is complete and the recorder is in condition to record, readout may begin. Accordingly, this means that the recorder printer has started its run from the left hand edge of the chart and is in position where printing is possible if data readout is occurring. If a helical recorder, such as that represented as helical recorder 54 in FIG. 1, is employed, this means that the helix has made contact with the recording bar at the extreme left side of the chart.

To make this synchronization possible, cam 51 is mounted on its rotating shaft 52 in such manner that switch 49 is programmed to be closed at the instant the helix makes contact with the recording bar at the left side of the chart.

The range gate pulse likewise plays a part in timing readout, along with the aforesaid switch 49 and cam 51. It, too, is differentiated by differentiator 47 to produce a properly timed trigger pulse, such as for example, that illustrated in FIG. 3(e), which, in turn, triggers single shot multivibrator 48. The inherent active time of multivibrator 48 should be so designed as to have a period that is slightly longer than the total readout period. Such period is depicted in the positive signal portion of the waveform of FIG. 3(f). When this positive signal portion is chopped by switch 49, an initiator pulse is supplied to readout pulse generator 57. Although it may occur at any time within the period of said positive signal, it should occur at such time as would allow the entire output of readout pulse generator 57 to likewise occur within the output period of single shot multivibrator 48. The pulse produced by the closure of cam operated switch 49 is represented by the waveform of FIG. 3(g), and when it is applied to readout pulse generator 57, a series of readout pulses similar to those shown in FIG. 3(h) is generated. An inspection of the waveform of FIG. 3(h) will readily disclose that four output pulses are produced by readout pulse generator 57 at such time, and that they all occur within the time period of single shot multivibrator 48 and its positive output signal.

These readout pulses are successively applied to memories 42 through 45, which causes them to unload the data stored therein, if any (in like succession. Those data which are unloaded are then amplified by recorder amplifier 63 before being applied to the chart printer of helical recorder 54. Hence, these readout and recording procedures are accomplished at such predetermined real times that conventional and commercially available strip-chart recorders and oscillographs, including helical recorder 54, can handle the recording operation easily and accurately.

The readout pulses from readout pulse generator 57 are so timed that the last one thereof occurs at the same time the helix of recorder 54 reaches the right hand limit of its travel across the chart. This last pulse is then differentiated by differentiator 64 to produce a signal waveform comparable to that illustrated in FIG. 3(i) before being applied to trigger bistable multivibrator 62 back to its initial state. In other words, the negative going pulse of this differentiated signal actually constitutes the operator which is supplied to bistable multivibrator 62 and which causes it to change its state back to what it was before the aforesaid differentiated keying pulse was applied thereto.

This change of state actually forms the trailing edge of the waveform of FIG. 3(d), and when this happens, a signal is simultaneously applied to each memory of the entire memory bank for erasure of any data stored therein. Also, when this happens, said signal is applied at the same time to readout pulse generator 57 so as to inactivate it until such time just prior to the beginning of a new storage cycle, when it is reactivated.

Reactivation of readout pulse generator 57 is effected by the next keying pulse. In actual practice, it is accomplished by first differentiating it in differentiator 59 and then applying it to bistable multivibrator 62 to cause it to change its state and again enable generator 57 and all of the memory units of bank 41.

While in the foregoing disclosure and discussion it was assumed that only one memory bank was used, it should be understood that two or more could be employed to record the output resulting from a like number of azimuth scans, each of which scans at slightly different range, and that the stored information could be read out and recorded sequentially. The total range increment covered in this case should not normally exceed the distance traveled between pings as otherwise a target could appear at two or more places on the chart. Under some conditions, however, this occurrence may be advantageous since it may aid in the detection of weak targets. The number of hydrophone scans that can be recorded and played back is approximately equal to the time between ping transmissions divided by the time required by the recorder to play back one complete scan.

It should be apparent that this technique is not limited to the case where the azimuth scan is much faster than the recorder capabilities, but that it will work just as well when the reverse is true.

It should be noted further that, while a discontinuous azimuth scan was assumed in this case, the subject technique is applicable to continuous scan sonars, as well. In such case, of course, a readin pulse would have to be generated each time the beam direction changes by an amount equal to its resolution. Hence, when used, for example, with a frequency modulated (FM) sonar, which ordinarily scans in azimuth at a low rate and in range at a very high rate, the output of one or more range filters could be fed to a like number of memory banks during one scan, and the results read out of the memory banks during the next scan. The total range information stored in this case would have to be at least as great as the distance the sonar moves along the vehicle's course during one complete scan cycle to avoid "holidays." Further, since the azimuth scan is continuous, the readin pulses would have to be generated to occur at particular points of the complete scan.

Figure 4:
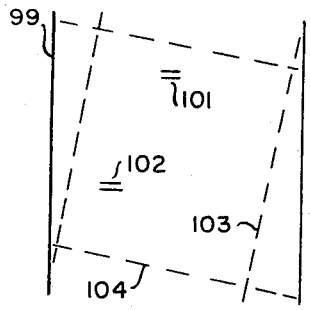
FIG. 4 illustrates the general appearance of the recorder chart which occurs when a short range gate and a navigational grid are employed.
Figure 5:
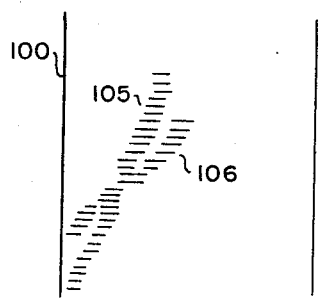
FIG. 5 depicts the general appearance of the recorder chart when a range gate nearly as long as the interval between pings is employed.

FIGS. 4 and 5 respectively disclose the appearance of a pair of typical charts 99 and 100 containing target information. FIG. 4 is intended to illustrate the way targets will be displayed when a relative narrow range gate setting is used, and FIG. 5 is intended to illustrate the way targets will be displayed when a very wide range gate setting is used. In the former case, it is seen that two separate targets 101 and 102 have been timely acquired by the echo-ranging sonar and their respective instantantaneous positions marked within position grids 103 and 104, as the carrier vessel moves along its course. In the latter case, it may be seen that two separate targets 105 and 106 are simultaneously seen as the carrier vessel moves along its course. Due to the fact that a printed chart is employed and that both of targets 105 and 106 fall within the wide range band, they are both continuously displayed relative to the carrier vessel's position as it moves along its intended course. This facilitates heading the ship or carrier vessel toward or away from the acquired targets, if so desired.

Both of the charts of FIGS. 4 and 5 may be made to move at some predetermined speed which is proportional to the speed of the carrier vessel. Thus, the length or ordinate of the chart indicates distance traveled and the width or abscissa of the chart represents the width of the path ahead of the carrier vessel that is being searched.

Other modifications and embodiments of the subject invention will readily come to the mind of one skilled in the art having the benefit of the teachings presented in the foregoing description and the drawings. It is, therefore, to be understood that this invention is not to be limited thereto and that said modifications and embodiments are intended to be included within the scope of the appended claims.

What is claimed is:

1. A data processing system comprising in combination,
    delay line means having an input and plurality of outputs respectively disposed at predetermined successive delay intervals thereon,
    a plurality of means for storing data signals respectively connected to the outputs of said delay line means for being timely energized thereby,
    means connected to said plurality of data signal storing means for the timely enabling and erasing thereof in response to a predetermined reference signal,
    means connected to said plurality of data signal storing means for respectively depositing data signals therein in response to the simultaneous occurrence of said predetermined reference signal and the energization thereof by the outputs of said delay line means,
    means connected to the outputs of said storing means for timely recording the data signals stored therein, and
    means connected to said recording means and said data signal storing means for reading out the data signals stored in said storing means and recording them in said recording means in response to a predetermined recording means program and the aforesaid reference signal.

2. A sonar mapping system comprising in combination,
    a sonar,
    a delay line having an input and a plurality of outputs respectively disposed at predetermined successive time delay intervals, with the input thereof connected to an output of said sonar,
    a plurality of memory units respectively connected to the outputs of said delay line for being timely energized thereby,
    means connected to said plurality of memory units for timely enabling and erasing thereof in response to a keying pulse output from the aforesaid sonar,
    means connected to said plurality of memory units for reading in data signals thereto in response to the concommitant occurrence of said keying pulse and the aforesaid memory unit energization delay line outputs,
    means connected to the outputs of said plurality of memory units for timely and permanently recording the data signals stored therein, and
    means connected to said recording means and said plurality of memory units for reading out the data stored in said memory units and recording them in said recording means in response to a predetermined recording means program and the aforesaid sonar keying pulse.

3. A sonar mapping system comprising in combination,
    an echo ranging sonar having at least one electroacoustical transducer for broadcasting target-searching acoustical signals throughout a subaqueous medium in response to a keying pulse produced thereby and a plurality of electroacoustical transducers for receiving echo data signals from targets located within said subaqueous medium, a delay line having an input connected to an output of said sonar and a plurality of outputs successively disposed therealong at predetermined time delay intervals, a plurality of memory units respectively connected to the aforesaid plurality of outputs from said delay line, a helical recorder connected to the outputs of said plurality of memory units, a range gate generator connected to said sonar for producing a range gate pulse in response to said keying pulse, a signal gate having a pair of inputs and an output, with one of the inputs thereof connected to the output of said range gate generator, the other input thereof connected to said echo-ranging sonar for receiving data signals therefrom, and the output thereof connected to the inputs of said plurality of memory units, a readout pulse generator having a plurality of inputs and outputs with a like plurality of said outputs respectively connected to the inputs of said plurality of memory units, means connected to the output of said range gate generator and an input of said readout pulse generator and to the aforesaid recorder for timely triggering said readout pulse generator into producing a series of pulses the number of which is identical to the number of memory units contained in the aforesaid plurality of memory units in predetermined synchronization with said recorder and in response to the aforesaid range gate pulse, and means connected to another of the inputs of said plurality of memory units and to another input of said readout pulse generator for timely enabling and disabling said readout pulse generator and enabling and erasing said memory units in response to the aforesaid keying pulse.

4. A data processing system comprising in combination, a delay line having an input adapted for being effectively connected to a predetermined data scanner and a plurality of outputs successively disposed therealong at predetermined delay intervals, a plurality of memory units each of which has a plurality of inputs and an output, with one of the inputs of each thereof respectively connected to one of the outputs of said delay lines, a recorder effectively connected to each of the outputs of the aforesaid plurality of memory units, a range gate generator for producing a variable delay-variable length range gate pulse in response to a predetermined keying pulse, a signal gate having a pair of inputs and an output with one of the inputs thereof coupled to the range gate pulse output of said range gate generator, the other input thereof adapted for receiving data signals to be stored in said plurality of memory units, and the output thereof connected to another of the inputs of each of said memory units, a readout pulse generator having a plurality of inputs and outputs with a like plurality of said outputs respectively connected to another of the inputs of each of said memory units, means connected to the output of said range gate generator and an input of said readout pulse generator and to the aforesaid recorder for timely triggering said readout pulse generator in predetermined synchronization with said recorder in response to said range gate pulse, and means connected to another of the inputs of each of said memory units and to another input of said readout pulse generator for timely enabling and disabling said readout pulse generator and energizing and erasing said memory units in response to the aforesaid keying pulse.

5. The device of claim 4 wherein said recorder is a strip-chart recorder having a controllable drive motor.

6. The device of claim 4 wherein said signal gate is a switch which is opened and closed by the aforesaid range gate pulse potentials.

7. The device of claim 4 wherein said means connected to the output of said range gate generator and an input of said readout pulse generator and to the aforesaid recorder for timely triggering said readout pulse generator in predetermined synchronization with said recorder in response to said range gate pulse comprises, a differentiator connected to the output of said range gate generator, a single shot multivibrator connected to the output of said differentiator, a cam-operated switch connected between the output of said single shot multivibrator and the input of said readout pulse generator, a rotatable shaft mounted on said recorder for rotation proportional to that of the chart drive thereof, and a cam mounted on said rotatable shaft and in contact with said switch in such manner that said switch is closed at the same time said recorder is in position to begin recording.

8. The device of claim 4 wherein said means connected to another of the inputs of each of said memory units and to another input of said readout pulse generator for timely enabling and disabling said readout pulse generator and energizing and erasing said memory units in response to the aforesaid keying pulse comprises, a first differentiator adapted for receiving said keying pulse at the input thereof, a second differentiator having its input connected to an output of said readout pulse generator, a pair of oppositely polarized diodes joined together and connected between the outputs of said first and second differentiators in such a manner that the output of one differentiator will not be applied to the other differentiator, a bistable multivibrator having its input connected to the junction of the aforesaid pair of oppositely polarized diodes and its output connected to an input of said readout pulse generator and to each of said plurality of memory units.

9. A sonar mapping system comprising in combination, a sonar system having a scan pulse signal output, a keying pulse signal output, and a data signal output, an isolation amplifier connected to the scan pulse output of said sonar system, a delay line having an input and a plurality of successively delayed outputs, with the input thereof connected to the output of said isolation amplifier, a plurality of memories the number of which is identical to the number of the outputs of the aforesaid delay line and each of which has a plurality of inputs and an output with one of the inputs thereof respectively connected to the aforesaid outputs of said delay line, a variable delay-variable length range gate generator connected to the keying pulse output of said sonar system, a first differentiator connected to the output of said range gate generator, a single shot multivibrator coupled to the output of said first differentiator, a readout pulse generator having a plurality of inputs and a plurality of outputs with a number thereof connected to the inputs of said plurality of memories respectively, a cam operated switch interconnecting the output of said single shot multivibrator and one of the inputs of said readout pulse generator, a signal gate having a pair of inputs and an output, with one of the inputs thereof connected to the output of said range gate generator and the other input thereof connected to the data signal output of said sonar system and with the output thereof connected to the input of each memory of the aforesaid plurality of memories, a second differentiator connected to the keying pulse output of said sonar system, a bistable multivibrator having an input and an output with the output thereof connected to an input of each memory of the aforesaid plurality of memories, a diode interconnecting the output of said second differentiator and the input of said bistable multivibrator in such manner that the signals may be conducted from said second differentiator to said bistable vibrator, a third differentiator connected to an output of the aforesaid readout pulse generator, a second diode interconnecting the output of said third differentiator and the input of said bistable multivibrator in such manner that signals may be conducted from the output of said third differentiator to the input of said bistable multivibrator, a helical recorder connected to the outputs of said plurality of memories, and a cam mounted mounted on said helical recorder in such manner as to close the aforesaid cam operated switch when the helical recorder is in its initial recording position.

10. A sonar mapping system consisting of:

a sonar system having a scan pulse signal output, a keying pulse signal output, and a data signal output, an isolation amplifier connected to the scan pulse output of said sonar system, a delay line having an input and a plurality of successively delayed outputs, with the input thereof connected to the output of said isolation amplifier, a plurality of memories the number of which is identical to the number of the outputs of the aforesaid delay line and each of which has a plurality of inputs and an output with one of the inputs thereof respectively connected to the aforesaid outputs of said delay line, a variable delay-variable length range gate generator connected to the keying pulse output of said sonar system, a first differentiator connected to the output of said range gate generator, a single shot multivibrator coupled to the output of said first differentiator, a readout pulse generator having a plurality of inputs and a plurality of outputs with a number thereof connected to the inputs of said plurality of memories respectively, a cam operated switch interconnecting the output of said single shot multivibrator and one of the inputs of said readout pulse generator, a signal gate having a pair of inputs and an output, with one of the inputs thereof connected to the output of said range gate generator and the other input thereof connected to the data signal output of said sonar system and with the output thereof connected to the input of each memory of the aforesaid plurality of memories, a second differentiator connected to the keying pulse output of said sonar system, a bistable multivibrator having an input and an output with the output thereof connected to an input of each memory of the aforesaid plurality of memories, a diode interconnecting the output of said second differentiator and the input of said bistable multivibrator in such manner that signals may be conducted from said second differentiator to said bistable multivibrator, a third differentiator connected to an output of the aforesaid readout pulse generator, a second diode interconnecting the output of said third differentiator and the input of said bistable multivibrator in such manner that signals may be conducted from the output of said third differentiator to the input of said bistable multivibrator, an amplifier connected to the outputs of said plurality of memories, a helical recorder connected to the output of said amplifier, and a cam mounted on said helical recorder in such manner as to close the aforesaid cam operated switch when the helical recorder is in its initial recording position.

11. Means for recording in real time the rapid output data signals from an echo-ranging system comprising in combination, an echo-ranging system having a scan pulse signal output, a keying pulse signal output, and a data signal output, a delay line having an input and a plurality of successively delayed outputs, with the input thereof connected to the scan pulse signal output of said echo-ranging system, a plurality of memory units the number of which is identical to the number of outputs of the aforesaid delay line and each of which has a plurality of inputs and an output with one of the inputs thereof respectively connected to the aforesaid outputs of said delay line, a variable delay-variable length range gate generator connected to the keying pulse output of said echo ranging system, a first differentiator connected to the output of said range gate generator, a single shot multivibrator coupled to the output of said first differentiator, a readout pulse generator having a plurality of inputs and a plurality of outputs with a number of said outputs respectively connected to the inputs of said plurality of memory units, a cam operated switch interconnecting the output of said single shot multivibrator and one of the inputs of said readout pulse generator, a signal gate having a pair of inputs and an output, with one of the inputs thereof connected to the output of said range gate generator, the other input thereof connected to the data signal output of said echo-ranging system, and with the output thereof connected to the input of each memory of the aforesaid plurality of memories, a second differentiator connected to the keying pulse output of said sonar system, a bistable multivibrator having an input and an output with the output thereof connected to the input of each memory unit of the aforesaid plurality of memory units, a diode interconnecting the output of said second differentiator and the input of said bistable multivibrator in such manner that signals may be conducted from said second differentiator to said bistable multivibrator, a third differentiator connected to the output of the aforesaid readout pulse generator, a second diode interconnecting the output of said third differentiator and the input of said bistable multivibrator in such manner that signals may be conducted from the output of said third differentiator to the input of said bistable multivibrator, a helical recorder effectively connected to the outputs of said plurality of memory units, and a cam mounted on said helical recorder in such manner as to close the aforesaid cam operated switch when said helical recorder is in its initial recording position.

12. A mapping system for an echo-ranging system consisting of:

an echo-ranging system having a scan pulse signal output, a keying pulse signal output, and a data signal output, a delay line having an input and a plurality of successively delayed outputs, with the input thereof connected to the scan pulse signal output of said echo-ranging system, a plurality of memory units the number of which is identical to the number of outputs of the aforesaid delay line and each of which has a plurality of inputs and an output with one of the inputs thereof respectively connected to the aforesaid outputs of said delay line, a variable delay-variable length range gate generator connected to the keying pulse output of said echo-ranging system, a first differentiator connected to the output of said range gate generator, a single shot multivibrator coupled to the output of said first differentiator, a readout pulse generator having a plurality of inputs and a plurality of outputs with a number of said outputs respectively connected to the inputs of said plurality of memory units, a cam operated switch interconnecting the outputs of said single shot multivibrator and one of the inputs of said readout pulse generator, a signal gate having a pair of inputs and an output, with one of the inputs thereof connected to the output of said range gate generator, the other input thereof connected to the data signal output of said echo-ranging system, and with the output thereof connected to the input of each memory of the aforesaid plurality of memories, a second differentiator connected to the keying pulse output of said sonar system, a bistable multivibrator having an input and an output with the output thereof connected to the input of each memory unit of the aforesaid plurality of memory units, a diode interconnecting the output of said second differentiator and the input of said bistable multivibrator in such manner that signals may be conducted from said second differentiator to said bistable multivibrator, a third differentiator connected to the output of the aforesaid readout pulse generator, a second diode interconnecting the output of said third differentiator and the input of said bistable multivibrator in such manner that signals may be conducted from the output of said third differentiator to the input of said bistable multivibrator, a helical recorder effectively connected to the outputs of said plurality of memory units, and a cam mounted on said helical recorder in such manner as to close the aforesaid cam operated switch when said helical recorder is in its initial recording position.

References Cited

UNITED STATES PATENTS

| | | | |
|---|---|---|---|
| 2,979,714 | 4/1961 | Wallace | 343—11 |
| 3,034,117 | 5/1962 | Tower et al. | 343—11 |
| 3,068,465 | 12/1962 | Covely et al. | 343—5 |
| 3,124,781 | 3/1964 | Loper et al. | 340—15.5 |
| 3,223,967 | 12/1965 | Lash | 340—15.5 |
| 3,296,579 | 1/1967 | Farr et al. | 340—3 |
| 3,296,580 | 1/1967 | Hopkin | 340—3 |

RICHARD A. FARLEY, *Primary Examiner.*

RODNEY D. BENNETT, *Examiner.*